Patented Jan. 17, 1950

2,494,784

UNITED STATES PATENT OFFICE 2,494,784

BRIQUETTE FOR DESALTING SEA WATER

Howard L. Tiger, Hewlett, N. Y., assignor to The Permutit Company, New York, N. Y., a corporation of Delaware No Drawing. Application December 16, 1944, Serial No. 568,563

2 Claims. (Cl. 252—175)

This invention relates to disrupters and more particularly to disrupters for briquettes containing ion exchangers.

One of the problems that has been accentuated as a result of the war is the provision of water for those stranded at sea in life rafts. For this purpose various devices have been proposed for the desalting of seawater. Perhaps of all the devices proposed the most satisfactory is the use of a silver alumino silicate cation exchanger which, together with the other ingredients, is capable of desalting seawater to a degree sufficient to make it potable. The silver alumino silicate cation exchangers for this purpose should have a maximum capacity per unit of weight. Moreover, since the space provided on any emergency equipment is definitely limited, it is also important that the volume of the silver cation exchanger should be a minimum.

To reduce the silver cation exchangers to a minimum of space, it is desirable to compress the exchanger in the form of a briquette, using pressures of the order of 5 to 20 tons per square inch or even higher. However, in using the higher pressure ranges, difficulty is encountered in breaking up the briquette for the utilization of the maximum capacities of the reactive materials. When a silver cation exchanger and other ingredients necessary to make water potable are compressed under these relatively high pressures, the resulting briquette does not disintegrate when placed in contact with seawater. Accordingly, if the stringent space requirements for emergency equipment are to be met with silver cation exchangers, a materially limited efficiency results if the compact briquette does not disintegrate readily.

In accordance with this invention, a compact briquette containing an ion exchanger is provided which disintegrates readily when contacted with water. In a specific embodiment of this invention, briquettes for the desalting of seawater comprising silver alumino silicates and other ingredients are relatively easily disintegrated when contacted with seawater. The briquette contains wilkinite, a Wyoming bentonite, in the amount of $\frac{1}{2}$ to 5% of the total weight of the briquette. Desirably the amount of wilkinite is from 1 to $2\frac{1}{2}$% of the total weight of the briquette and substantially all of the wilkinite is of a particle size which passes through a 50 mesh sieve and is maintained on a 140 mesh sieve. The briquette containing the wilkinite disintegrates after a relatively short period when immersed in seawater, and accordingly exposes the surface of the active ingredients of the briquette to the seawater. As a result the sodium chloride and other salts in the seawater are quickly reduced in amount to render the seawater potable.

It has been proposed previously by others to use fuller's earth as a disrupter in such briquettes. Investigations were carried out with this material. These experiments proved that when fuller's earth was used to the extent of 5% of the weight of the briquette, the resulting briquette failed to disintegrate appreciably in 15 minutes. On the other hand, a briquette made from the same ion exchange materials and other ingredients, together with a quantity of wilkinite equal to 5% of the weight of the briquette disintegrated substantially completely within 3 minutes.

The briquette in accordance with this invention is prepared by taking a quantity by weight of the ion exchanger material, such as the desalting chemical required, and an amount of wilkinite corresponding to $\frac{1}{2}$ to 5%, and preferably 1 to $2\frac{1}{2}$%, of the total weight of all of the ingredients. The desalting chemicals and wilkinite are then thoroughly mixed by any suitable means and the mixture is compressed to the desired extent in a briquette press. For most purposes a pressure between 4 and 20 tons per square inch has been found satisfactory. Desirably, the wilkinite employed for this purpose passes through a 30 mesh sieve and is retained on a 200 mesh sieve, and preferably the wilkinite used passes through a 50 mesh sieve and is retained on a 140 mesh sieve.

It should be noted that the moisture content of the final briquette has a marked effect on the rate of disruption. This moisture content is determined by drying a sample of the material before briquetting to constant weight at 150° C., and, if it appreciably exceeds 3 to 6%, the time required for disruption of the briquette produced at a given pressure increases also. At the same time care must be exercised to avoid over-drying the material because a "bone-dry" material does not briquette satisfactorily from a mechanical point of view. Also if the material is "overdried" at an excessive temperature its ion exchange capacity may be impaired. Generally it has been found that a 2% moisture content is a fairly safe lower limit, although with some mixtures it may be necessary to increase the moisture content somewhat even at the expense of some disruption efficiency.

In the various examples presented herein, the moisture content of the final mixture was in the range of 2 to 8%. However, in each individual series the moisture content of the various materials tested was approximately the same so that this moisture factor did not influence the comparative disruption observations, i. e., the differences in disruption time were due to other factors, such as the type or proportion or grain size of the disrupter in question. Thus, these results give a true basis for comparing the performance of various disrupters without confusion from a variation in moisture contents in any given series.

A more comprehensive understanding of this invention is obtained by reference to the following examples:

Example 1.—Briquettes were prepared by compressing at 10 tons/sq. in. equal weights of the following mixtures:

(a) A desalting mixture containing mainly silver alumino silicate and also other ingredients, but no disrupter;

(b) The same silver alumino silicate desalting mixture containing 5% fuller's earth;

(c) The same silver alumino silicate desalting mixture containing 2.85% sodium bicarbonate and 2.15% citric acid, which constitute a $CO_2$ gas forming mixture when contacted with water;

(d) The same silver alumino silicate desalting mixture containing 5% Colorado (San Luis valley) bentonite;

(e) The same silver alumino silicate desalting mixture containing 5% wilkinite.

On placing the resulting briquettes in seawater, briquettes (a), (b) and (c) showed no signs of breaking up spontaneously after more than 15 minutes and could not even be broken up by hand. Briquette (d) developed a crack after 10 minutes, but showed no further signs of spontaneous disintegration. Briquette (e) spontaneously broke up in three minutes forming small flakes, which were readily reducible to powder by slight hand manipulation.

Example 2.—78 parts of silver alumino silicate, 6.2 parts of other ion exchange materials, 1 part of stearic acid mold lubricant and 2.3 parts of wilkinite were thoroughly mixed in a suitable apparatus, such as a dry blender, and formed into a briquette in a hydraulic press at 6 tons/sq. in. The mixture used for briquetting had an initial density of 1.08 grams/cc. The briquette formed in the process had a density of 1.36 grams/cc. When this briquette was placed in seawater, it broke up spontaneously within about three minutes. Similar briquettes were prepared using pressures between 4 to 20 tons/sq. in. and yielded briquettes having densities between 1.30 grams/cc. and 1.89 grams/cc. When placed in seawater these briquettes spontaneously disrupted into small particles within from about 1 to 5 minutes. Briquettes prepared under similar conditions in the absence of any wilkinite did not disrupt spontaneously when allowed to stand in contact with seawater for more than an hour.

While coarser particles of wilkinite resulted in more rapid spontaneous disruption of the briquettes, the resulting particles were relatively coarser than those produced by the use of finer particles of wilkinite in the original mixture, and therefore these particles were less reactive with seawater. Conversely, it has been found that the finer particle sizes of wilkinite resulted in slower spontaneous disruption of the briquettes but provided finer particles of the reactive material and therefore more effective desalination of the seawater. While the particle size range of wilkinite including material which passes through a 30 mesh sieve but is retained by a 200 mesh sieve is satisfactory, the preferred particle size range includes material which passes through a 50 mesh sieve and is retained on a 140 mesh sieve.

The effects of variations in the particle size of the wilkinite upon disruption time and desalination performance are illustrated by the following example:

Example 3.—A series of briquettes were prepared using 91% silver alumino silicate, 7% other reactive ingredients and 2% wilkinite. These mixtures were briquetted under 4 tons/sq. in. pressure and the resulting briquettes were used for the desalination of seawater containing 540 milliequivalents (meq.) chloride ion per liter. A briquette prepared using wilkinite which passed through a 50 mesh sieve but was retained on a 60 mesh sieve disrupted spontaneously in 2½ minutes and after ½ hour had reduced the salt content of the seawater to 114 meq./1. Another briquette prepared with wilkinite which passed through a 100 mesh sieve but was retained on a 140 mesh sieve required more than 5 minutes for spontaneous disruption, but after ½ hour it had reduced the salt content of the seawater to 89 meq./1. Briquettes prepared with wilkinite passing through a 140 mesh sieve required much longer periods for disruption and, in some cases, did not entirely break up spontaneously. Briquettes prepared from material retained on a 50 mesh sieve broke up rapidly but reduced the salt content of the seawater to a much smaller extent than did briquettes prepared using wilkinite which passed through a 50 mesh sieve.

Example 4.—To a mixture of 70 parts of silver alumino silicate and 3.9 parts of other reactive ingredients, there were added 1 to 2% by weight of wilkinite, substantially all of which passed through a 50 mesh sieve and was retained on a 140 mesh sieve. The ingredients were thoroughly mixed in a dry blender and briquetted in a hydraulic press at a pressure of about 10 tons/sq. in. Under these conditions there were formed briquettes having a density of about 1.50 grams/cc. When placed in seawater these briquettes spontaneously disrupted into small particles in 5 minutes or less.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A briquette consisting essentially of silver alumino silicate and a disrupter capable of disintegrating said briquette quickly when said briquette is immersed in seawater and comprising wilkinite, said wilkinite being in the amount of 1 to 2½% of the total weight of the briquette and substantially all of said wilkinite being of a particle size which passes through a 50 mesh sieve and is retained on a 140 mesh sieve.

2. A briquette consisting essentially of silver alumino silicate and a disrupter capable of disintegrating said briquette quickly when said briquette is immersed in seawater and comprising wilkinite, said wilkinite being in the amount of 1 to 2½% of the total weight of the briquette and substantially all of said wilkinite being of a particle size which passes through a 50 mesh sieve and is retained on a 140 mesh sieve, and said briquette containing from 2 to 8% moisture.

HOWARD L. TIGER.

REFERENCES CITED

The following references are of record in the file of this patent:

UNITED STATES PATENTS

| Number | Name | Date |
|---|---|---|
| 935,695 | Schultze | Oct. 5, 1909 |
| 2,066,271 | Irwin | Dec. 29, 1936 |
| 2,284,827 | Lindsay et al. | June 2, 1942 |

OTHER REFERENCES

Bentonite Handbook, Bulletin No. 107 of Silica Products Company, (1934), pages 16 and 17.

Mellor: Inorganic and Theoretical Chemistry, vol. 6, (1925), page 683.

Certificate of Correction

Patent No. 2,494,784                                  January 17, 1950

HOWARD L. TIGER

It is hereby certified that errors appear in the printed specification of the above numbered patent requiring correction as follows:

Column 4, lines 71 to 74, inclusive, and column 5, lines 5 to 8, inclusive, strike out the words "a disrupter capable of disintegrating said briquette quickly when said briquette is immersed in seawater and comprising";

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*